(12) United States Patent
Kalantar et al.

(10) Patent No.: US 7,558,864 B2
(45) Date of Patent: Jul. 7, 2009

(54) METHOD, SYSTEM AND PRODUCT FOR IDENTIFYING, RESERVING, AND LOGICALLY PROVISIONING RESOURCES IN PROVISIONING DATA PROCESSING SYSTEMS

(75) Inventors: Michael Husayn Kalantar, Millwood, NY (US); Liana Liyow Fong, Irvington, NY (US); Patrick Joseph Brooks, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 866 days.

(21) Appl. No.: 10/765,775

(22) Filed: Jan. 27, 2004

(65) Prior Publication Data
US 2005/0163143 A1 Jul. 28, 2005

(51) Int. Cl.
*G06F 15/16* (2006.01)
(52) U.S. Cl. ............... 709/229; 709/217; 709/238
(58) Field of Classification Search .......... 709/217, 709/229, 238
See application file for complete search history.

(56) References Cited

U.S. PATENT DOCUMENTS

| | | | |
|---|---|---|---|
| 5,835,727 A * | 11/1998 | Wong et al. ............ | 709/238 |
| 5,922,049 A * | 7/1999 | Radia et al. ............ | 709/220 |
| 5,978,387 A | 11/1999 | Sherman ............... | 370/468 |
| 6,009,103 A | 12/1999 | Woundy ................ | 370/401 |
| 6,078,946 A | 6/2000 | Johnson ................ | 709/200 |
| 6,275,857 B1 * | 8/2001 | McCartney ............. | 709/226 |
| 6,308,163 B1 * | 10/2001 | Du et al. ............... | 705/8 |
| 6,496,567 B1 | 12/2002 | Bjornberg et al. ...... | 379/88.02 |
| 6,556,544 B1 | 4/2003 | Lee .................... | 370/256 |
| 7,103,647 B2 * | 9/2006 | Aziz .................... | 709/220 |
| 2002/0087665 A1 * | 7/2002 | Marshall et al. ........ | 709/220 |
| 2004/0125801 A1 * | 7/2004 | Nawata ................ | 370/389 |
| 2005/0055694 A1 * | 3/2005 | Lee .................... | 718/100 |
| 2005/0165938 A1 * | 7/2005 | Cornett ................ | 709/229 |

\* cited by examiner

*Primary Examiner*—Kenny S Lin
*Assistant Examiner*—Thomas J Dailey
(74) *Attorney, Agent, or Firm*—Yee & Associates, P.C.; William H. Steinberg

(57) ABSTRACT

A method, system, and computer program product are disclosed for logically provisioning resources in a data processing system. A request for one or more resources to be provisioned in a provisioning environment is received. The requested resources may be of multiple different available types of resources. Particular instances of the requested types of resources are selected from a group of different types of unassigned available resources. The selected resources are indicated as being reserved, and thus no longer unassigned or available, to fulfill this request. The selected resources are then logically provisioned by establishing logical relationships between the selected resource instances in the provisioning environment.

27 Claims, 6 Drawing Sheets

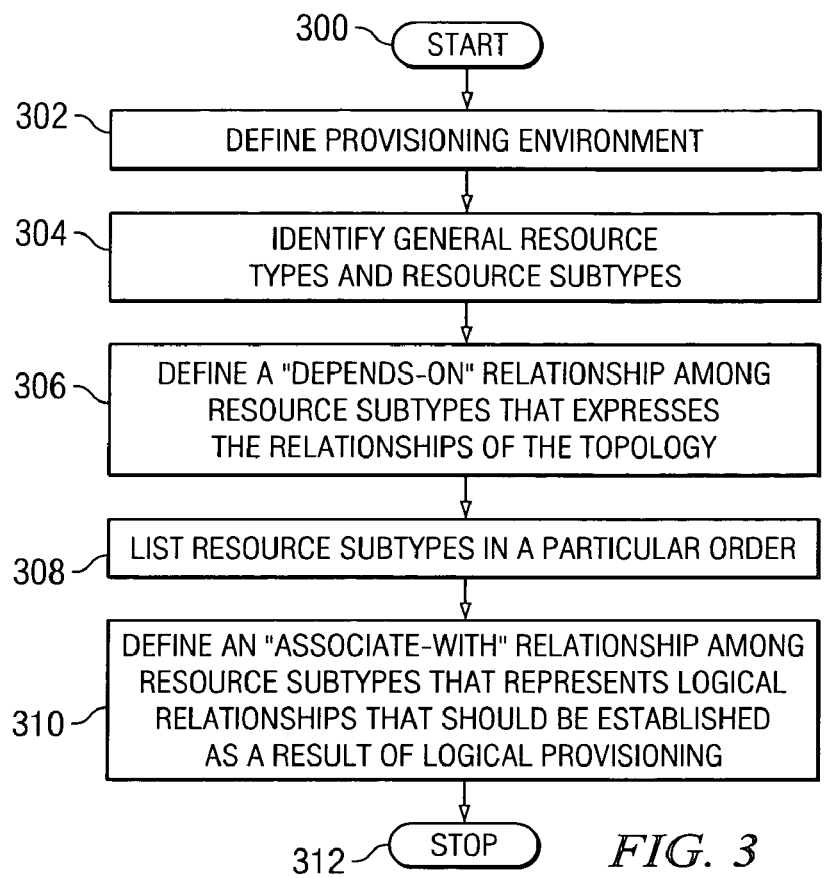

FIG. 3

```
500 ─ Select (R, I, N) returns resource instance set
       Identify a minimal r ∈ R using topological order ─ 501
       Let S_1, ... , S_k be all sets of N_r resource instances ─ 502
such that:  ∀ s ∈ S_j is of subtype r
            ∀ s ∈ S_j is available
            ∀ s ∈ S_j , if r depends-on r', ∃ t ∈ I such
that t is of type r' and s depends on t
  503 ─ for j = 1 to k do
        504 ─ success = set_all_states
                       (S_j, 'available', 'reserving')
        505 ─ if (success)
              I' = Select (R-{r}, I U S_j, N) ─ 506
              if (I' not equal (I U S_j) ) then ─ 507
                  return (I U S_j U I') ─ 508
        509 ─ else set_all_states
                       (S_j, 'reserving', 'available')
              end ─ 510
  511 ─ end
        return (I) ─ 512
```

FIG. 5

METHOD, SYSTEM AND PRODUCT FOR IDENTIFYING, RESERVING, AND LOGICALLY PROVISIONING RESOURCES IN PROVISIONING DATA PROCESSING SYSTEMS

BACKGROUND OF THE INVENTION

1. Technical Field

The present invention relates generally to resource provisioning and auto-provisioning systems, and in particular to a method, system, and product for identifying, reserving, and logically provisioning particular resources in such systems.

2. Description of Related Art

Resource provisioning systems are relatively new types of systems. These systems permit configuration of computing resources that have been selected by a user. The computer resources include servers, firewalls, and software. Once a user has selected a particular resource to be provisioned, the provisioning system will assist in some configurations of the selected resource. For example, if a server with a single network interface is to be placed in a particular virtual local area network (VLAN), the provisioning system will help configure the VLAN on a set of switches and configure the switch port to which the server is connected to be in the VLAN. Existing systems, however, do not provide a method for dynamically and automatically identifying available resources, reserving the resources, and then establishing new relationships among the resources in order to satisfy a resource request.

The process of provisioning resources can be very complex and vary in many different dimensions. The provisioning process for each resource type is different. For example, the processes to configure computer servers are different from the processes to configure network storage devices and software. Even for resources of the same type, there may be many variations. For example, provisioning processes to support software configurations are very different for different software packages.

In a provisioning system, resources can be divided into a number of resource types. This includes, but is not limited to, servers, VLANs, IP addresses, and software. Instances of resources can be categorized by resource type. For example, a server is a type of resource. The particular server having serial number 123456 is a particular individual server and is referred to herein as an "instance" of a server or a "particular" server. Herein, the term "resource" should be understood to mean resource instance.

Furthermore, types of resources can be subdivided by some set of attributes of the resource types. For example, types of servers can be divided into disjoint subsets by server model number. A subset of resource types can be described by its type and subtype, or description of a set of resource attributes. Requests for resources are expressed as requests for instances of a type or subtype of resource.

In addition to membership in a resource type or subtype, resource instances may have predefined relationships with other resource instances of the same or different types. For example, for a server that is already wired into a network, the network interface connector of the server instance has a physical relationship with a switch port instance of a switch instance. Another example would be the relationship between a VLAN instance and a subnet (i.e., a set of IP address instances). These predefined relationships exist because the resource instances are physically related to each other when they are physically connected, as described above in the first example, or are logically connected by defining specific unchanging relationships, as described above in the second example.

Currently, most provisioning systems focus on resource provisioning mechanisms rather than on the identification and reservation of resources with inter-resource relationships. For example, if a server with a single network interface is to be placed in a particular VLAN, the resource provisioning mechanisms provide the methods to configure the VLAN on a set of switches and to configure the switch port to which the server is connected to be in the VLAN. To fulfill a provisioning request, these systems use the notion of server pools. Servers in a pool already have associations with particular resource instances such as particular firewall instances, IP addresses instances, and VLAN instances because these servers are already physically connected to these resources instances as assigned by an administrator, for example, through a graphical user interface (GUI). None of the systems provide programmatic capabilities to dynamically identify or reserve multiple related resource instances to use for a provisioning request.

Changes that should be made to create or modify a requested user environment, using the above described resource provisioning mechanisms, are recorded by creating associations between existing resource representations. The process of creating logical associations between resource representations is called logical provisioning. For example, if a provisioning request specifies that a particular type of software should be installed on a server, the software resource must be logically associated with the server. Another example would be to associate a reserved IP address with the network interface of a reserved server. The logical provisioning indicates what needs to be done and can later be used to drive changes on the physical resources. Again, existing systems do not provide mechanisms to logically provision resources.

Therefore, a need exists for a method, system, and computer program product for dynamically identifying, reserving, and logically provisioning particular resource instances in a provisioning data processing system.

SUMMARY OF THE INVENTION

A method, system, and computer program product in a provisioning data processing system are disclosed for identifying particular resource instances to fulfill a particular provisioning request, controlling the selection of particular resources so that the necessary number of particular resources are selected for fulfilling the request, and logically provisioning the identified resources by creating new associations among the selected particular resources.

A request for a set of resources is received. Each requested resource is one of multiple different available types of resources. Selection of particular resource types may imply the selection of other resource types or may require the selection of other resource types. For example, the selection of a server implies the selection of some number of network interfaces while the selection of a load balancer may require the selection of one or more VLANs. Implied and required resources are added to the set or requested resources. A particular instance of each requested type of resource is selected from a group of unassigned available resources. The selected resources are indicated as being reserved, and thus no longer unassigned or available, to fulfill this request or other requests. The selected resources are then logically provisioned by establishing logical relationships between the selected resource instances.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 2B-1 and 2B-2 are a block diagram that illustrates a set of resources after a number of provisioning requests have been made and the resources have been provisioned in accordance with the present invention;

FIG. 3 depicts a high level flow chart which illustrates identifying and defining relationships among resources types to implement a provisioning environment in accordance with the present invention;

FIG. 5 depicts, in detail, the process of identifying resources in a provisioning environment in accordance with the present invention.

DETAILED DESCRIPTION OF THE PREFERRED EMBODIMENT

Figure 1:
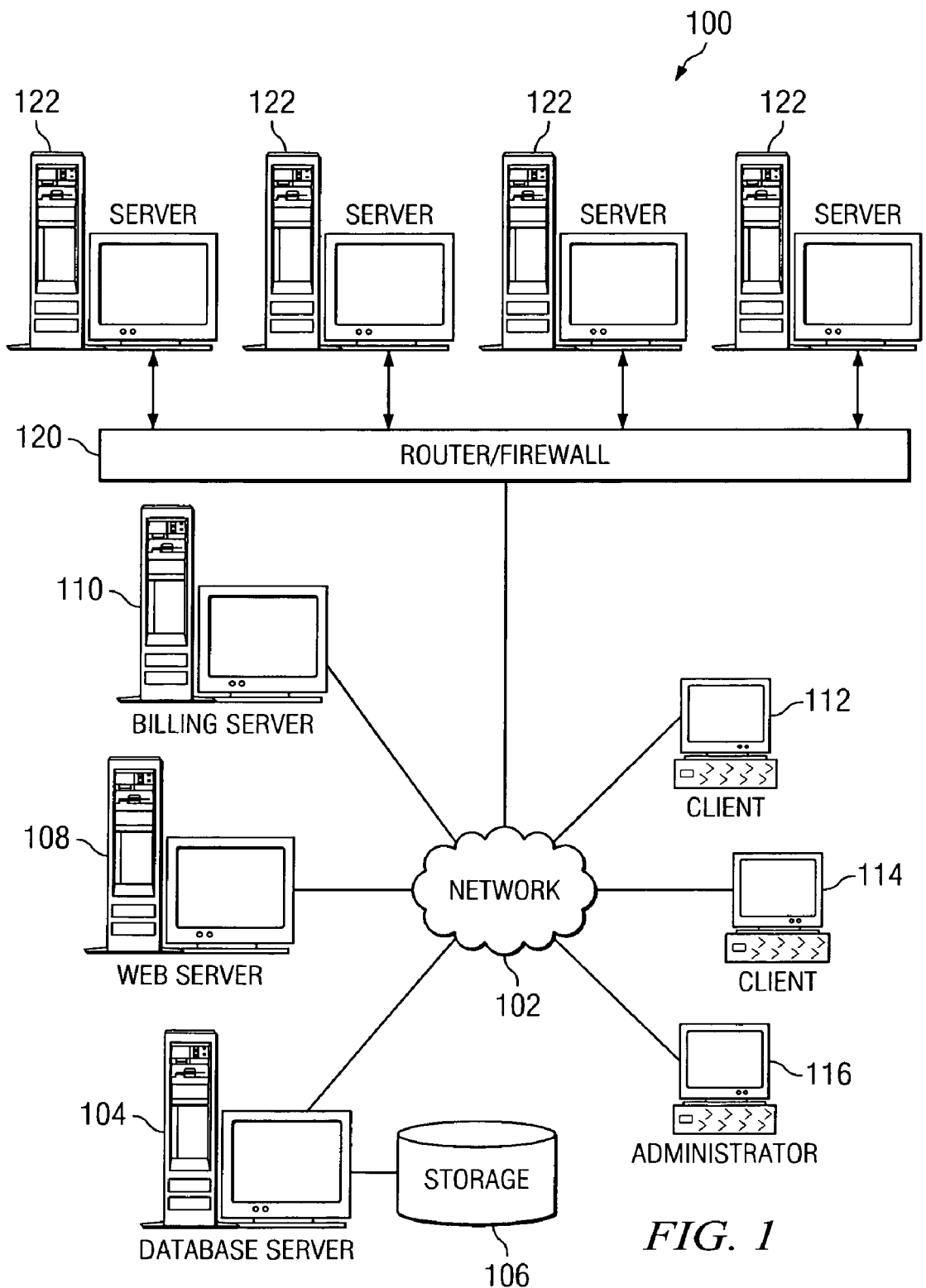
FIG. 1 is a block diagram of a data processing system in which the present invention may be implemented in accordance with the present invention.

A preferred embodiment of the present invention and its advantages are better understood by referring to the figures, like numerals being used for like and corresponding parts of the accompanying figures.

The present invention provides a general method that can be used to identify specific resource instances that will be used to fulfill a particular provisioning request, to reserve them, and to logically provision them by assigning new relationships among the reserved resource instances. The present invention provides for a dynamic and automatic method, system, and product for selecting particular instances of resources from a group of resources, indicating that the selected resource instances are currently in the process of being reserved to fulfill a user request, and then to establish relationships between the selected resource instances and resource instances of other resource types that are necessary to support the selected resource instances. For example, when a server is selected, appropriate IP addresses, VLANs, load balancer and firewalls are other resources necessary to provide the connectivity of the server.

Some of the relationships among the different types of resources are pre-defined. These relationships are used automatically and dynamically to ensure that all other types of supporting resources are also selected and added to the user requested environment along with the particular set of resource instances requested.

A given set of relationship definitions for a given provisioning environment can be used to fulfill multiple resource requests and to logically provision resources in a particular way in that provisioning environment. Different provisioning environments will typically require different relationship definitions because the environment defines different relationships and the logical provisioning process will be different. For example, a protected provisioning environment has VLAN and firewall resources as associated relationships while an unprotected provisioning environment may not have any of these.

If different resource types and thus relationships are added to a provisioning environment; i.e., the provisioning environment changes, or if the logical provisioning steps change, new relationship definitions must be used. The process defined by this patent uses the resource relationships as input to a generic process by which resources can be selected, reserved and logically provisioned.

In the preferred embodiment of the present invention, each resource instance is associated with at least two state variables. One state variable identifies whether or not a resource instance is shared. A second state variable indicates the current state of the resource instance. The defined states for the second state variable include "available", "reserving", and "reserved". They have the following interpretations:

Available—The resource instance is free for use. It is not being used.

Reserving—The resource instance is not free for use. It has been selected to fulfill a request and is in the process of being logically provisioned.

Reserved—The resource instance is not free for use. It has been assigned to an owner and has been logically provisioned.

Any mechanism that implements these resource states is included in the method of this invention.

FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, database server 104 is connected to network 102 and provides access to storage unit 106. Web server 108 and billing server 110 are also connected to network 102. Server group 122 is connected to the network through router/firewall 120. Database server 104, Web server 108, billing server 110, and server group 122 are examples of resources in network data processing system 100. In fact, the router itself, the firewall, and other hardware or software elements are also examples of resources that are part of network data processing system 100. These resources are also possible entities to be deployed and configured in the provisioning system.

Computing resources included in an autoprovisioning system may be grouped into different types and subtypes, with types having varying degrees of granularity. Each type may be associated with a set of attributes or specifications that are common to those resources. For example, the types of resources may be classified into server hardware, network hardware, storage hardware, operating system software, database middleware software, application software, and monitoring software. A resource type can be further divided into subtypes. Examples of resource subtypes of the server type including IBM pSeries servers and Sun Sparc servers. Instances of a resource type are resource entities, which are grouped by their resource subtypes.

In addition, clients 112, 114, 116 are connected to network 102. These clients may be, for example, personal computers or network computers. In the depicted example, database server 104 provides data, such as boot files, operating system images, and applications to clients 112, 114, 116. Clients 112, 114, 116 are clients to server 104. Network data processing system 100 may include additional servers, clients, and other devices not shown.

Particularly, administrator client 116 is a client to be used by a provisioning administrator to define and provision resources in network data processing system 100.

FIG. 1 is intended as an example, and not as an architectural limitation for the present invention.

Figure 2A:
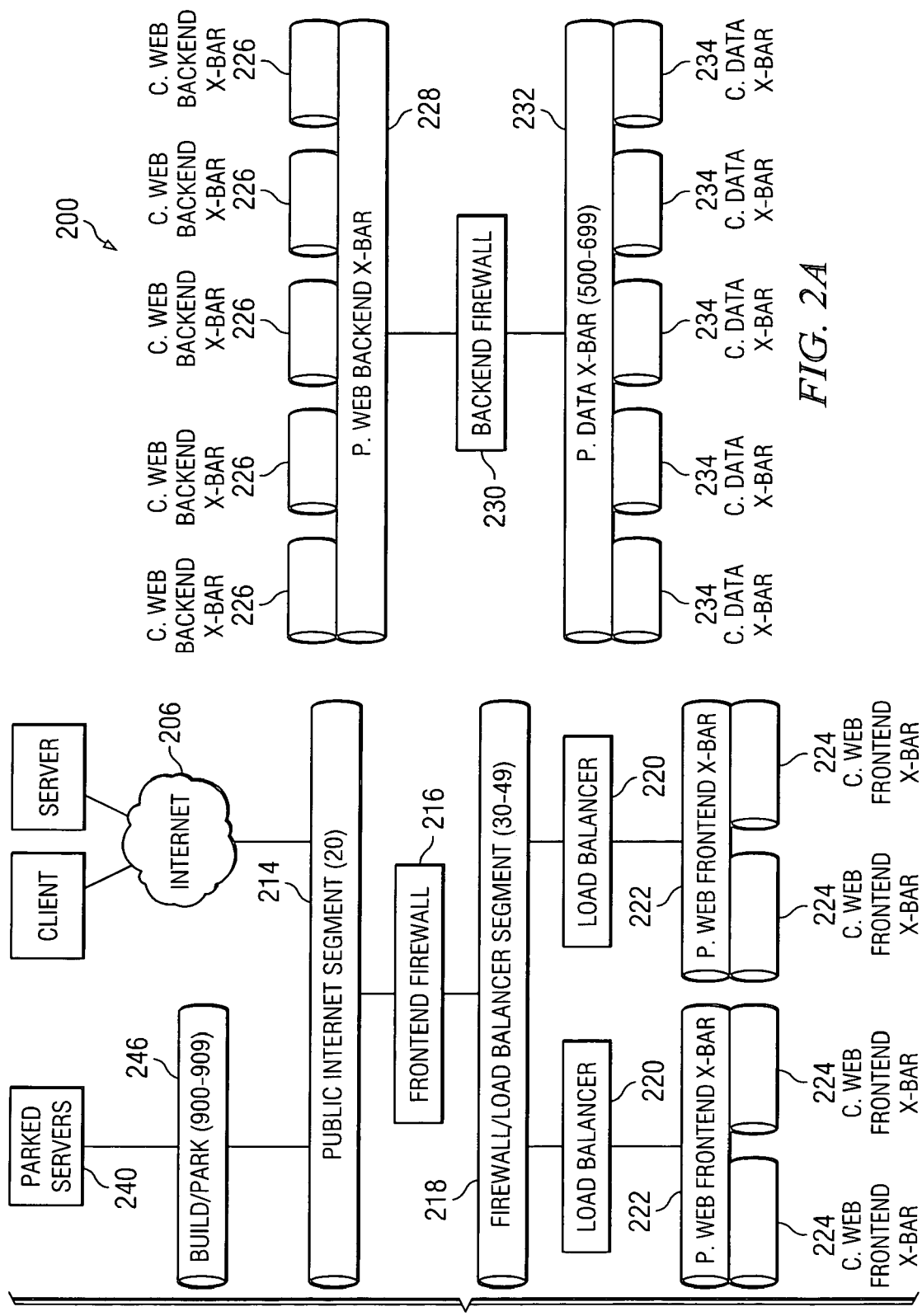
FIG. 2A is a block diagram that depicts a set of resources in a provisioning environment before any provisioning requests have been made where all of the servers are parked but the other resources are configured to each other in accordance with the present invention.

FIG. 2A is a block diagram that depicts the resources of a provisioning environment before any requests have been made where all resources are configured in an initial configuration. For example, all of the servers are parked on a Build/Park VLAN and have an initial state of "available". The other depicted resources are configured as they are physically and logically connected in some suitable initial configuration. In FIGS. 2A and 2B-1-2B-2, the set of resources represents a protected two-tiered provisioning environment 200. VLANs are shown in the diagrams using "pipes". Each is labeled with a range of numbers that are considered valid for a VLAN of that type. In FIG. 2A, these represent the ranges of available VLANs of each VLAN subtype. In FIGS. 2A and 2B-1-2B-2 some of the VLANs may be in states other than "available". Note that the numbering is a notational convenience and not a required feature of this architecture. The shorter pipes (not numbered in the Figure) are "community" VLANs. Community VLANs are a specialized type of VLAN supported by some switch hardware.

Figures 1, 2B:
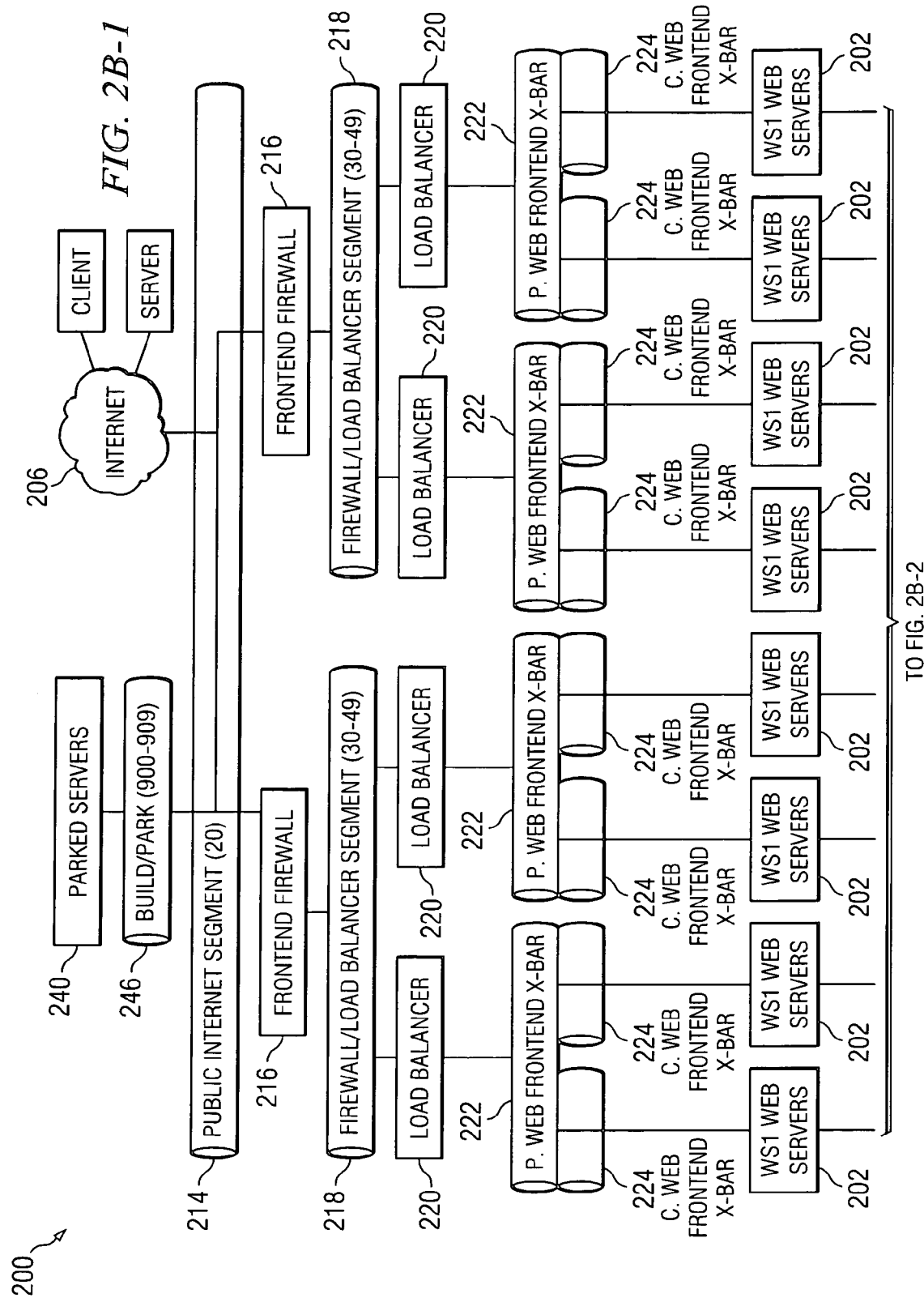
Figures 2, 2B:
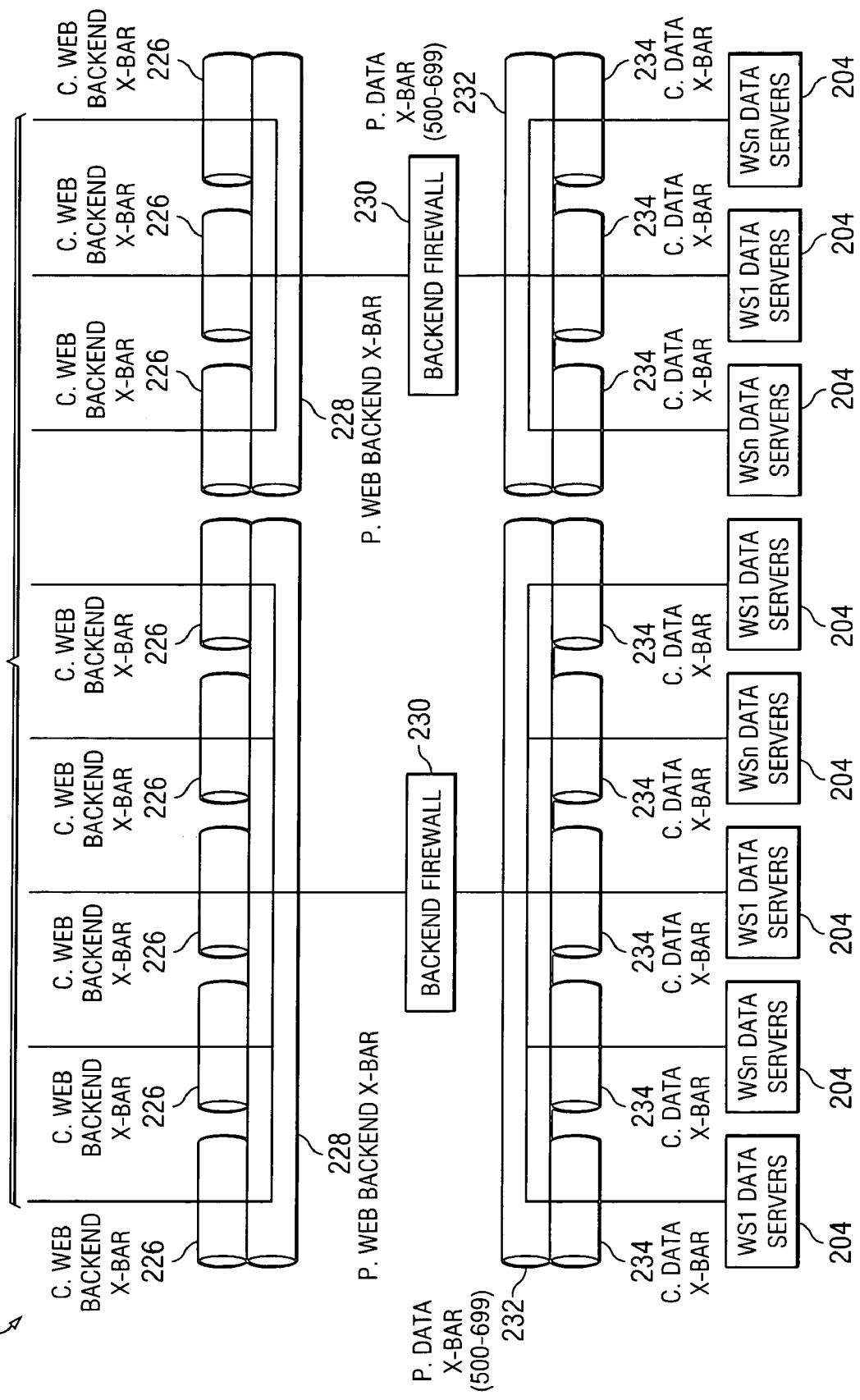

Provisioning environment 200 contains parked (i.e., available) servers 240 that may be used as either Web Servers or Data Servers (shown as 202 and 204 in FIGS. 2B-1-2B-2). Each server will include two network interface cards (NIC) that are not illustrated in FIGS. 2A and 2B-1-2B-2. Each NIC is connected to a switch port that is not illustrated in FIGS. 2A and 2B-1-2B-2. Each switch port is a member of a VLAN for the purpose of network isolation. Further, each VLAN has a number of IP addresses assigned to it. The IP addresses are not illustrated in FIGS. 2A and 2B-1-2B-2. Not all other resources are illustrated.

Traffic from outside the environment passes from the Internet 206 through a Public Internet Segment VLAN 214. It then passes through a frontend firewall 216 to a Firewall/Load Balancer Segment 218. From there, it passes through a load balancer 220 to a primary Web Frontend x-bar VLAN 222 and to a community Web Frontend x-bar 224. Although not depicted in the figure, the primary 222 and community 224 Web Frontend x-bar VLANs may each have a set of valid and unique numbers such as (100-299). Note that while all traffic physically passes through a load balancer in this exemplary provisioning environment, this does not mean that all traffic is load balanced. Load balancing across a subset of the web servers is optional.

FIGS. 2B-1 and 2B-2 are a block diagram that illustrates a set of resources after a number of requests have been made and the resources have been provisioned in accordance with the present invention. Once servers have been provisioned, as depicted in FIGS. 2B-1 and 2B-2, the traffic from community Web frontend x-bar 224 reaches a Web Server 202. Traffic from a web server 202 to a data server 204 passes through the community Web Backend x-bar VLAN 226 to primary Web Backend x-bar VLAN 228 to a Backend firewall 230 and then to a primary Data x-bar VLAN 232 and community Data x-bar VLAN 234. Finally it reaches a data server 204.

A provisioning request identifies various quantities of different resource types that are required to fulfill the request. However, it is not desirable or feasible for user requests to include a listing of every required resource as the user may only know the resources for his/her application usage and may have no detailed knowledge of the whole provisioning environment. For example, if a server is required by a user request, other resources are also required. These include, but are not limited to, any NICs the server may have, any switch ports to which the NICs are connected, and any VLANs to which these switch ports should be added. Furthermore, as a part of logical provisioning, relationships between resources are established. For example, a relationship between a switch port and a VLAN must be established to add a selected server into an appropriate network environment.

This preferred embodiment uses the example provisioning environment in FIGS. 2A and 2B-1-2B-2 to describe the process by which the relationships between resources in a provisioning environment are identified. These include both established relationships and relationships that are to be established as part of logical provisioning. These relationships are then used as input to a general process that can be used to identify available resource instances, reserve them and logically provision them to satisfy resource requests.

FIG. 3 depicts a high level flow chart that illustrates identifying and defining relationships among resource types in a provisioning environment in accordance with the present invention. The process starts as depicted by block 300 and thereafter passes to block 302 which depicts defining a provisioning environment such as that in FIGS. 2A and 2B-1-2B-2. Next, block 304 illustrates identifying resource types and subtypes in the defined provisioning environment. For example, the following are general resource types described above with reference to FIGS. 2B-1-2B-2: IP addresses, VLANs, load balancers, firewalls, servers, network interface cards, and switch ports. These general resource types may be further divided into specific subtypes. For example, the following are the subtypes for each general resource types depicted in FIGS. 2B-1-2B-2:

| General Resource Type | Resource Subtype |
|---|---|
| IP Addresses | Virtual |
| | Web Frontend |
| | Web Backend |
| | Data Frontend |
| VLANs | Internet Feed |
| | Firewall/Load Balancer Segment |
| | Primary Web Frontend x-bar |
| | Community Web Frontend x-bar |
| | Primary Web Backend x-bar |
| | Community Web Backend x-bar |
| | Primary Data x-bar |
| | Community Data x-bar |
| Load Balancers | Load Balancer |
| Firewalls | Front End |
| | Back End |
| Servers | various depending on number of model, number of CPUs and amount of memory - Web |
| | various depending on number of model, number of CPUs and amount of memory - Data |

-continued

| General Resource Type | Resource Subtype |
|---|---|
| NIC | Front End |
|  | Back End |
| Switch Port |  |

Block 306, then, illustrates defining a "depends-on" relationship among subtypes of resources that expresses the relationships of a particular provisioning environment. For example, an experienced network architect may create a particular topology, such as that depicted by FIGS. 2B-1-2B-2, which is a layout of the various resource types of the network and how these resource types are physically and logically connected together. The "depends-on" relationship describes these defined relationships.

The "depends-on" relationship is transitive. For example, if resource type A depends on resource type B and resource type B depends on resource type C, then resource type A depends on resource type C.

For example, the following is an example of the "depends-on" relationships depicted by the provisioning environment of FIGS. 2B-1-2B-2:

| Resource Subtype | depends-on . . . |
|---|---|
| Frontend Firewall | Public Internet Segment VLAN |
| Firewall/Load Balancer Segment VLAN | Frontend Firewall |
| Virtual IP Addresses | Firewall/Load Balancer Segment VLAN |
| Load Balancer | Firewall/Load Balancer Segment VLAN |
| Primary Web Frontend x-bar VLAN | Load Balancer |
| Web Frontend IP Addresses | Primary Web Frontend x-bar VLAN |
| Community Web Frontend x-bar VLAN | Primary Web Frontend x-bar VLAN |
| Primary Web Backend x-bar VLAN | Back End Firewall |
| Web Backend IP Addresses | Primary Web Backend x-bar VLAN |
| Community Web Backend x-bar VLAN | Primary Web Backend x-bar VLAN |
| Primary Data Frontend x-bar VLAN | Back End Firewall |
| Data Frontend IP Addresses | Primary Data Frontend x-bar VLAN |
| Community Data Frontend x-bar VLAN | Primary Data Frontend x-bar VLAN |
| Front End NIC | Server |
| Back End NIC | Server |
| Switch Port | NIC |

The process then passes to block 308 which lists the subtypes of resources that were defined using the "depends-on" relationships in a particular order. Any valid topological order that is consistent with the "depends-on" relationships is acceptable.

One acceptable order for the depicted provisioning environment example is:
(various) Server Specifications
Internet Feed VLAN
Frontend Firewall
Firewall/Load Balancer VLAN
Virtual IP Addresses
Load Balancer
Primary Web Frontend x-bar
Web Frontend IP Addresses
Community Web Frontend x-bar VLAN
Back End Firewall
Primary Web Backend x-bar
Web Back End IP Addresses
Community Web Backend x-bar VLAN
Primary Data Frontend x-bar
Data Frontend IP Addresses
Community Data Frontend x-bar VLAN
Front End NIC
Back End NIC
Switch Port Block 310, thereafter, illustrates an "associate-with" relationship among resources that represents the logical relationships that should be established as a result of logical provisioning. For example, in the provisioning environment of FIGS. 2A and 2B-1-2B-2, a part of the provisioning process is to configure a server so that it can communicate with other servers assigned to the same customer. One step in this process is to assign a set of IP addresses to a server, that is, to the server's NICS. The resource subtypes of the first column depicted below are to be associated with the resource subtypes of the second column. The "associate-with" relation is reflexive. That is, if a resource subtype A is "associate-with" resource subtype B, then resource subtype B is "associate-with" resource subtype A.

According to the example under discussion, the "associate-with" relationship is defined as follows:

| Resource Subtype | Associate-with |
|---|---|
| Virtual IP Address | Load Balancer |
|  | Server Group |
| Web Frontend IP Address | Web Server Frontend NIC |
| Web Server.Frontend NIC.Switch Port | Community Web Frontend x-bar VLAN |
| Web Backend IP Address | Web Server.Backend NIC |
| Web Server.Backend NIC.Switch Port | Community Web Backend x-bar VLAN |
| Data Frontend IP Address | Data Server.Frontend NIC |
| Data Server.Frontend NIC.Switch Port | Community Data Frontend x-bar VLAN |
| Data Server.Backend NIC.Switch Port | Community Data Frontend x-bar VLAN |

Figure 4:
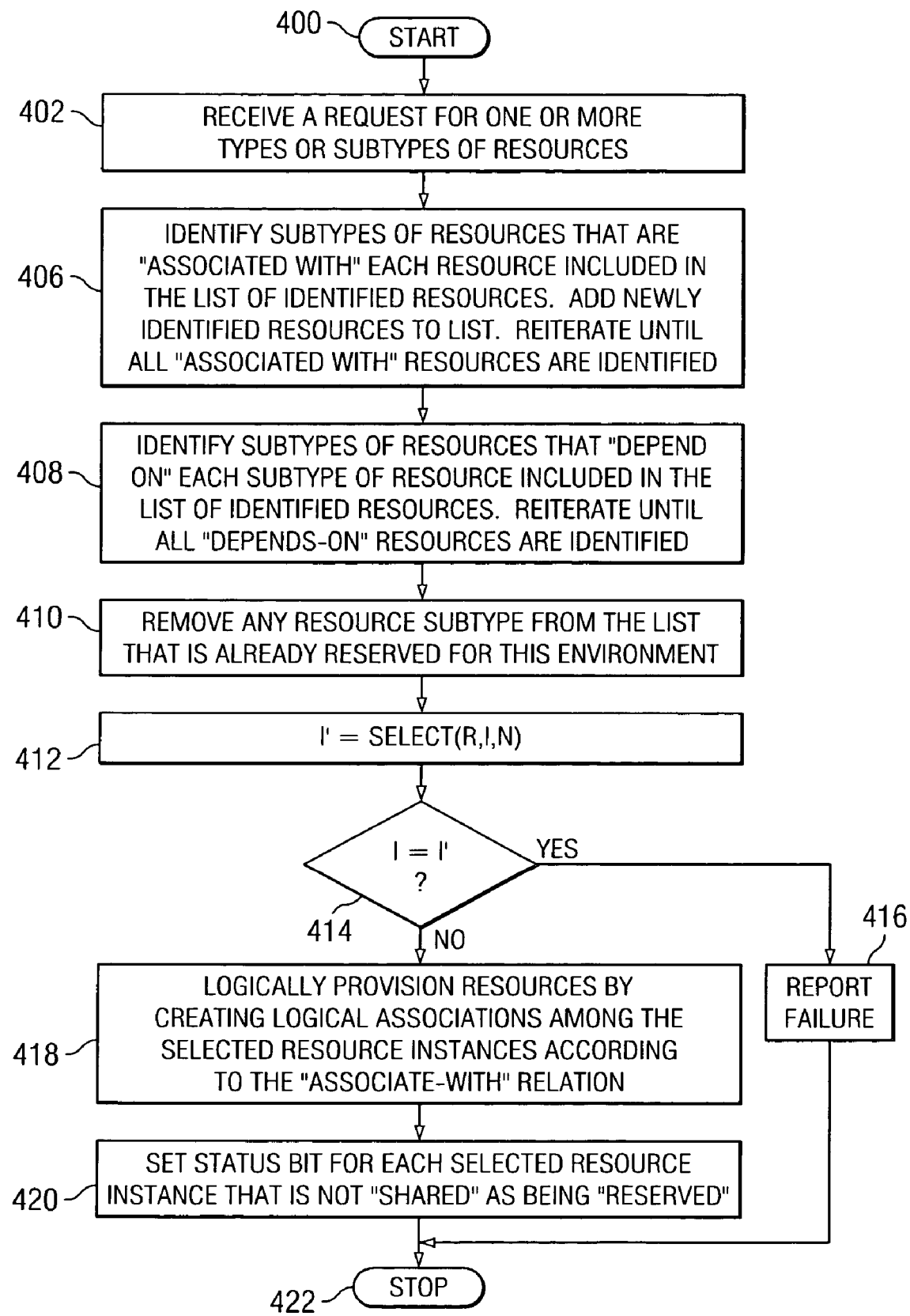
FIG. 4 illustrates a high level flow chart which depicts identifying, reserving, and logically provisioning resources according to a resource request in a provisioning environment in accordance with the present invention.

FIG. 4 illustrates a high level flow chart which depicts identifying, reserving, and logically provisioning resources according to a resource request in a provisioning environment in accordance with the present invention. The process starts as illustrated by block 400 and thereafter passes to block 402 which depicts a request received. A resource request contains a set of resource types and a quantity of each to be reserved. The request may also include a list of previously reserved resources to be used to satisfy this request, if such resource instances have already been previously reserved. In more detail, the requested list of resources to be reserved will identify a resource subtype for each requested resource type, and a list of attributes and values to be matched including a quantity. For example, the resource request may include a list of server groups to be reserved specifying for each group of servers: a server subtype, the number of servers in the group, whether particular virtual IP addresses are requested, i.e. whether the group is to be load balanced, and what role the servers will play, such as whether they are web servers or data servers.

A very simplified example of a resource request is a request for a single virtual IP address and an empty group of servers. This example will be used below to further describe the present invention.

The process then passes to block 406 which depicts identifying subtypes of resources that are to be "associated-with" each requested resource subtype. These newly identified resource subtypes are added to the list of requested resource subtypes. This process is reiterated until all "associate-with" resource subtypes are identified. This augmentation takes place for the following reason: if a resource subtype A is to be associated with a resource subtype B, then instances of both subtypes A and B will be required in order to complete the step of logical provisioning in which the association is completed. The required number of resources instances of each newly added resource subtype can be determined by the original number of requested resources.

Thus, following the example, a virtual IP address is to be associated with a load balancer and a server group. Thus, the list of identified resource subtypes includes a list of one virtual IP address, one load balancer, and one server group. Then, no further iterations of the "associate-with" relationship added additional subtypes to the list.

Next, block 408 illustrates identifying subtypes of resources that "depend on" each subtype of resource that is included in the list of identified resource subtypes. This process is also reiterated until all "depends-on" resource subtypes are identified. In this case, the newly identified resource subtypes are added for the following reason: If a resource subtype A depends on another resource subtype B, then in order to select the resource instances of subtype A it will be necessary to know which resource instance of subtype B has been identified.

In the example, a virtual IP address depends on a firewall/load balancer segment VLAN, a load balancer depends on a firewall/load balancer segment VLAN, a firewall/load balancer segment VLAN depends on a frontend firewall, and a frontend firewall depends on the Public Internet Segment VLAN. This list was created by first discovering that the virtual IP address depends on the firewall/load balancer segment VLAN and that the load balancer depends on the firewall/load balancer segment VLAN. During the next pass, it was discovered that the firewall/load balancer segment VLAN depends on the frontend firewall. During the next pass of the "depends-on" relationship, it was discovered that the frontend firewall depends on the Public Internet segment VLAN. Thus, the list includes one virtual IP address, one load balancer, one server group, one firewall/load balancer segment VLAN, one frontend firewall, and one Public Internet Segment VLAN.

Block 410, then, depicts removing any resource subtype from the list for which sufficient resource instances have already been reserved for this request. If a resource subtype has already been reserved to fulfill this need, another one does not need to be reserved. Recall that the list of resource instances that have been previously reserved is a part of the resource request. In the example, there are no resource instances already reserved so no resource subtypes need to be removed.

The process then passes to block 412 which illustrates calling a process called "Select( )" to identify a consistent set of resources that are available to satisfy the request. Select( ) takes three input parameters: R, I and N and returns one output parameter: I'. R represents the set of requested resource subtypes augmented by the steps of blocks 406, 408 and 410. I is the set of resource instances previously reserved and available to fulfill the request. N is a set of numbers identifying the number of required resource instances of each resource subtype. In general, let N[r] represent the number of resource instances of subtype r that are required. As in the case of R, this set is derived from the input request and the processing of steps 406, 408 and 410. The output I' represents the set of resource instances that get identified as fulfilling the resource request. If no consistent set of resources can be identified block 412 returns the input set of resources instances. That is, I equal to I'.

Next, block 414 depicts determining if a consistent set of resource instances was identified by checking if the value of the input parameter I equals the value of the output parameter I'. If so, no suitable resource instances were identified and the process passes to block 416 which depicts reporting a failure. It then terminates at block 422. On the other hand, if a consistent list of resource instances was identified (I' properly contains I), the process proceeds to block 418 which depicts logically provisioning the selected resource instances in the provisioning environment. That is, logical associations are created among the selected instances according to the "associate-with" relation. Thereafter, block 420 illustrates setting the status bit for each selected resource that is not "shared" as being "reserved". "Shared" resources are available for more than one selection and thus are not set to reserved. The process then terminates as depicted by block 422.

FIG. 5 is pseudocode depicting the process by which a consistent set of resources is identified to satisfy a particular customer request; that is, an implementation of the "Select( )" procedure used in block 412. Line 500 depicts the name of the process ("Select( )") and its input and output parameters. Select( ) takes three input parameters: R, I and N and returns one output parameter: a set of resource instances. R represents the set of requested resource types. I is the set of resource instances previously identified to fulfill the request. N is a set of numbers identifying the number of required resource instances of each resource subtype. In general, let N[r] represent the number of resource instances of subtype r that are required. The output is a set of resource instances that are identified to fulfill the resource request. If no consistent set of resources can be identified Select( ) will return the input set of resources instances.

The process begins on line 501 by selecting a minimal resource subtype (according to the depends-on relation) from the set of all required resource subtypes (i.e., from R). A resource subtype is minimal if it does not depend-on any other resource subtypes. To do this, the topological sort identified in 308 can be used. The smallest (first) element of R in the topological order will be minimal. Once a minimal resource subtype r has been selected, the process continues at line 502 to identify all sets of N[r] available resource instances of type r. Further, sets of resource instances should meet the following condition: for all resource instances s in the set, if r depends-on a resource subtype r', then there exists a resource instance t already selected (in I) that is of subtype r' and such that t is of subtype r' and s depends-on t. That is, the subtype dependency must be reflected in among the selected instances. Note that when selecting resource instances of subtype r, instances of all subtypes that r depends-on, such as r' above, have already been selected because resource subtypes are chosen in the identified topological order (minimal type first). Consequently, when selecting resources of subtype r, it is possible to ensure that the instances are compatible with the selected instances of other subtypes that they depend on. For the resource subtypes described in this preferred embodiment, an instance may be selected if the following is true:

1. To select a Server instance it is necessary to ensure that it:
   a. has a status bit that is set as "available";
   b. matches the requested server subtype.
2. To select an Internet Feed VLAN instance, it is necessary to ensure that it:
   a. has a status bit that is set as "available"; and
   b. has a sufficient number of Frontend Firewall VLANs available.
3. To select a Frontend Firewall VLAN instance, it is necessary to ensure that it:
   a. has a status bit that is set as "available"; and
   b. has a sufficient number of Firewall/Load Balancer Segment VLANs available.
4. To select a Firewall/Load Balancer Segment VLAN instance, it is necessary to ensure that it:
   a. has a status bit that is set as "available";
   b. has a sufficient number of Virtual IP Addresses available; and
   c. has a sufficient number of Load Balancer instances available.
5. To select a Virtual IP Address instance, it is necessary to ensure that it:
   a. has a status bit that is set as "available".
6. To select a Load Balancer instance, it is necessary to ensure that it:
   a. has a status bit that is set as "available"; and
   b. has a sufficient number of Primary Web Frontend x-bar VLANs instances available.
7. To select a Primary Web Frontend x-bar VLAN instance, it is necessary to ensure that it:
   a. has a status bit that is set as "available";
   b. has a sufficient number of Web Frontend IP Addresses available; and
   c. has a sufficient number of Community Web Frontend x-bar VLANs instances available.
8. To select a Web Frontend IP Address instance, it is necessary to ensure that it:
   a. has a status bit that is set as "available".
9. To select a Community Web Frontend x-bar VLAN instance, it is necessary to ensure that it:
   a. has a status bit that is set as "available".
10. To select a Back End Firewall instance, it is necessary to ensure that it:
    a. has a status bit that is set as "available";
    b. has a sufficient number of Primary Web Backend x-bar VLANs instances available; and
    c. has a sufficient number of Primary Data Frontend x-bar VLANs instances available.
11. To select a Primary Web Backend x-bar VLAN instance, it is necessary to ensure that it:
    a. has a status bit that is set as "available";
    b. has a sufficient number of Community Web Backend x-bar VLANs instances available; and
    c. has a sufficient number of Web Backend IP Addresses.
12. To select a Community Web Backend x-bar VLAN instance, it is necessary to ensure that it:
    a. has a status bit that is set as "available".
13. To select a Web Backend IP Address instance, it is necessary to ensure that it:
    a. has a status bit that is set as "available".
14. To select a Primary Data Frontend x-bar VLAN instance, it is necessary to ensure that there are a sufficient number of Community Data Frontend x-bar VLANs instances and a sufficient number of Data Frontend IP Addresses available.
15. To select a Primary Data Frontend x-bar VLAN instance, it is necessary to ensure that it:
    a. has a status bit that is set as "available";
    b. has a sufficient number of Community Data Frontend x-bar VLANs instances available; and
    c. has a sufficient number of Data Frontend IP Addresses available.
16. To select a Community Data Frontend x-bar VLAN instance, it is necessary to ensure that it:
    a. has a status bit that is set as "available".
17. To select a Data Frontend IP Address instance, it is necessary to ensure that it:
    a. has a status bit that is set as "available".

The process then loops, between lines 503 and 511, checking whether or not the set of selected resources of subtype r allows for a suitable selection of resource instances of other required subtypes. This is accomplished first by setting the states of the selected resources that are not "shared" to "reserving" at line 504. A sub-procedure "set_all_states( )" is used to do this. set_all_states( ) takes three input parameters: a set of resource instances whose states should be changed, the expected current state of each resource instance, and the desired final state of each resource instance. set_all_states( ) returns a boolean value set to true if it was able to set the states of each non-shared resource instance to the desired final state and false otherwise. The states are set in this manner to prevent other, independent calls to Select( ) from trying to reserve the same set of resource instances. However, before setting the state of the resource instances to "reserving" it is possible that another independent call to Select( ) is also considering some of the same resource instances and might have already set them to "reserving". Therefore, the call set_all_states( ) must check that the state is still in the expected initial state and be atomic; that is, the checking and setting of states must appear to be executed as a single uninterruptible operation. Any mechanism that implements atomic actions can be used such as mutual exclusion.

The process continues on line 505 where it checks the success of the set_all_states( ) call. If the call was successful, processing proceeds to line 506 where an attempt is made to identify resources of the remaining resource types. That is, Select( ) is called recursively with the first argument set to the input set of resource types minus the resource type just selected (i.e., R-{r}). The second argument is set to the input set of selected resource instances plus the set of resource instances of type r just selected. Finally, the third argument can be the same. On line 507 the output of the call to Select( ) is evaluated. If the set of identified resource instances has changed, then a consistent set of resource instances was identified. The whole set of the those originally input to the Select( ) procedure, those instances of subtype r selected by the current invocation, and the set returned by the recursive call to Select( ) are returned as the output of the call on line 508. In this case, processing terminates. If no resource instances could be identified in the recursive Select( ) call, processing proceeds to the else clause on line 509 where the state of the non-shared resource instances of subtype r are reset to "available". The conditional statement started on line 505 terminates and processing continues to line 511. Line 511 is the termination of a loop. Hence, processing continues at line 505 if all of the possible sets of resource instances of subtype r have not been checked. If all have been checked, processing continues to line 512 which returns the original (input) list of selected resources instances; that is, no additional resource instances of subtype r can be found that allows for the selection of the remaining required resource instances of other subtypes.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for logically provisioning resources in a data processing system, said method comprising the steps of:

receiving a request for a set of resources in a plurality of resources in a provisioning environment within the data processing system, wherein each resource in said set of resources is one of a plurality of different types of resources, wherein said plurality of different types of resources comprises hardware elements and software elements;

associating a current state variable and a shared state variable with each one of said plurality of resources, wherein the current state variable indicates whether the each one of said plurality of resources is available, in a process of being reserved, or reserved, and wherein the shared state variable indicates whether the each one of said plurality of resources is a shared resource;

selecting a particular instance of a resource in said set of resources of said plurality of resources from a group of unassigned available resources of said plurality of different types of resources;

indicating that said selected particular instance is in the process of being reserved utilizing the current state variable, wherein said selected particular instance is unavailable for selection after indicating that said selected particular instance is in the process of being reserved, wherein said selected particular instance is unavailable for selection by another request prior to provisioning said selected particular instance, and wherein a selection is prevented of any of said plurality of resources having an indication of in the process of being reserved;

logically provisioning said selected particular instance to fulfill the request by establishing logical relationships between said selected particular instance and other resources; and responsive to logically provisioning said selected particular instance to fulfill the request, indicating whether the each one of said plurality of resources is reserved utilizing the current state variable, wherein a reserved resource has an established logical relationship with said provisioning environment and said reserved resource's shared state variable indicates said reserved resource is not a shared resource.

2. The method according to claim 1, further comprising the steps of:

identifying other ones of said plurality of resources that said selected particular instance requires for use.

3. The method according to claim 2, further comprising the steps of:

selecting a particular instance for each of said other ones from a group of unassigned available resources of said plurality of different types of resources that said selected particular instance requires for use; and logically provisioning said selected particular instance for each of said other ones to fulfill a request by establishing logical relationships between each of said other ones.

4. The method according to claim 1, further comprising the steps of:

said group of unassigned available resources including no preassigned logical associations with any other one of said plurality of resources.

5. The method according to claim 1, further comprising the steps of:

creating a topology for said provisioning environment, said topology including a layout of said plurality of different types of resources; and said layout defining relationships among said plurality of different types of resources.

6. The method according to claim 5, further comprising the steps of:

utilizing said relationships defined by said layout to identify other ones of said plurality of resources that said selected particular instance requires for use.

7. The method according to claim 6, further comprising the steps of:

determining other ones of said plurality of resources that are to be associated with said particular instance.

8. The method according to claim 6, further comprising the steps of:

determining other ones of said plurality of resources that depend on said particular instance.

9. The method according to claim 1, wherein the request comprises a list of previously reserved resources to be used to satisfy the request.

10. A computer program product in a computer readable storage medium for logically provisioning resources, said computer program product comprising:

computer usable program code stored in the computer readable storage medium, wherein the computer usable program code is adapted to cause a processor in a computer to perform steps comprising:

receiving a request for a set of resources in a plurality of resources in a provisioning environment within the data processing system, wherein each resource in said set of resources is one of a plurality of different types of resources, wherein said plurality of different types of resources comprises hardware elements and software elements;

associating a current state variable and a shared state variable with each one of said plurality of resources, wherein the current state variable indicates whether the each one of said plurality of resources is available, in a process of being reserved, or reserved, and wherein the shared state variable indicates whether the each one of said plurality of resources is a shared resource;

selecting a particular instance of a resource in said set of resources of said plurality of resources from a group of unassigned available resources of said plurality of different types of resources;

indicating that said selected particular instance is in the process of being reserved utilizing the current state variable, wherein said selected particular instance is unavailable for selection after indicating that said selected particular instance is in the process of being reserved, wherein said selected particular instance is unavailable for selection by another request prior to provisioning said selected particular instance, and wherein a selection is prevented of any of said plurality of resources having an indication of in the process of being reserved;

logically provisioning said selected particular instance to fulfill the request by establishing logical relationships between said selected particular instance and other resources; and responsive to logically provisioning said selected particular instance to fulfill the request, indicating whether the each one of said plurality of resources is reserved utilizing the current state variable, wherein a reserved resource has an established logical relationship with said provisioning environment and said reserved resource's shared state variable indicates said reserved resource is not a shared resource.

11. The computer program product according to claim 10, further comprising:
identifying other ones of said plurality of resources that said selected particular instance requires for use.

12. The computer program product according to claim 11, further comprising:
selecting a particular instance for each of said other ones from a group of unassigned available resources of said plurality of different types of resources that said selected particular instance requires for use; and
logically provisioning said selected particular instance for each of said other ones to fulfill a request by establishing logical relationships between each of said other ones.

13. The computer program product according to claim 10, further comprising:
said group of unassigned available resources including no preassigned logical associations with any other one of said plurality of resources.

14. The computer program product according to claim 10, further comprising:
creating a topology for said provisioning environment, said topology including a layout of said plurality of different types of resources; and
said layout defining relationships among said plurality of different types of resources.

15. The computer program product according to claim 14, further comprising:
utilizing said relationships defined by said layout to identify other ones of said plurality of resources that said selected particular instance requires for use.

16. The computer program product according to claim 15, further comprising:
determining other ones of said plurality of resources that are to be associated with said particular instance.

17. The computer program product according to claim 15, further comprising:
determining other ones of said plurality of resources that depend on said particular instance.

18. The computer program product according to claim 10, wherein the request comprises a list of previously reserved resources to be used to satisfy the request.

19. An apparatus for logically provisioning resources, said apparatus comprising:
a processor, and instructions stored in a memory, wherein the instructions are adapted to cause the processor to perform a plurality of steps comprising:
receiving a request for a set of resources in a plurality of resources in a provisioning environment within the data processing system, wherein each resource in said set of resources is one of a plurality of different types of resources, wherein said plurality of different types of resources comprises hardware elements and software elements;
associating a current state variable and a shared state variable with each one of said plurality of resources, wherein the current state variable indicates whether the each one of said plurality of resources is available, in a process of being reserved, or reserved, and wherein the shared state variable indicates whether the each one of said plurality of resources is a shared resource;
selecting a particular instance of a resource in said set of resources of said plurality of resources from a group of unassigned available resources of said plurality of different types of resources;
indicating that said selected particular instance is in the process of being reserved utilizing the current state variable, wherein said selected particular instance is unavailable for selection after indicating that said selected particular instance is in the process of being reserved, wherein said selected particular instance is unavailable for selection by another request prior to provisioning said selected particular instance, and wherein a selection is prevented of any of said plurality of resources having an indication of in the process of being reserved;
logically provisioning said selected particular instance to fulfill the request by establishing logical relationships between said selected particular instance and other resources; and
responsive to logically provisioning said selected particular instance to fulfill the request, indicating whether the each one of said plurality of resources is reserved utilizing the current state variable, wherein a reserved resource has an established logical relationship with said provisioning environment and said reserved resource's shared state variable indicates said reserved resource is not a shared resource.

20. The apparatus according to claim 19, further comprising:
identifying other ones of said plurality of resources that said selected particular instance requires for use.

21. The apparatus according to claim 20, further comprising:
selecting a particular instance for each of said other ones from a group of unassigned available resources of said plurality of different types of resources that said selected particular instance requires for use; and
logically provisioning said selected particular instance for each of said other ones to fulfill a request by establishing logical relationships between each of said other ones.

22. The apparatus according to claim 19, further comprising:
said group of unassigned available resources including no preassigned logical associations with any other one of said plurality of resources.

23. The apparatus according to claim 19, further comprising:
   creating a topology for said provisioning environment, said topology including a layout of said plurality of different types of resources; and
   said layout defining relationships among said plurality of different types of resources.

24. The apparatus according to claim 23, further comprising:
   utilizing said relationships defined by said layout to identify other ones of said plurality of resources that said selected particular instance requires for use.

25. The apparatus according to claim 24, further comprising:
   determining other ones of said plurality of resources that are to be associated with said particular instance.

26. The apparatus according to claim 24, further comprising:
   determining other ones of said plurality of resources that depend on said particular instance.

27. The apparatus according to claim 19, wherein the request comprises a list of previously reserved resources to be used to satisfy the request.

* * * * *